US007120277B2

United States Patent
Pelagotti et al.

(10) Patent No.: US 7,120,277 B2
(45) Date of Patent: Oct. 10, 2006

(54) SEGMENTATION UNIT FOR AND METHOD OF DETERMINING A SECOND SEGMENT AND IMAGE PROCESSING APPARATUS

(75) Inventors: Anna Pelagotti, Eindhoven (NL); Gerard Anton Lunter, Eindhoven (NL); Massimo Ciacci, Florence (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 722 days.

(21) Appl. No.: 10/145,071

(22) Filed: May 14, 2002

(65) Prior Publication Data

US 2003/0035583 A1    Feb. 20, 2003

(30) Foreign Application Priority Data

May 17, 2001 (EP) ................... 01201868

(51) Int. Cl.
*G06K 9/00* (2006.01)
*G06K 9/36* (2006.01)
(52) U.S. Cl. ............... 382/107; 382/103; 382/106; 382/236
(58) Field of Classification Search ............ 382/104, 382/107, 103
See application file for complete search history.

(56) References Cited

U.S. PATENT DOCUMENTS

| 4,862,260 | A  | * | 8/1989  | Harradine et al. ......... 348/699 |
| 5,410,358 | A  | * | 4/1995  | Shackleton et al. ........ 348/459 |
| 5,646,691 | A  | * | 7/1997  | Yokoyama ............... 348/416.1 |
| 5,991,428 | A  | * | 11/1999 | Taniguchi ................. 382/107 |
| 6,525,765 | B1 | * | 2/2003  | Brett et al. .................. 348/97 |
| 6,560,372 | B1 | * | 5/2003  | Kadono ..................... 382/243 |
| 6,809,758 | B1 | * | 10/2004 | Jones ..................... 348/208.99 |
| 2003/0072482 | A1 | * | 4/2003 | Brand ........................ 382/154 |

* cited by examiner

*Primary Examiner*—Joseph Mancuso
*Assistant Examiner*—Robert Tarcu
(74) *Attorney, Agent, or Firm*—Larry Liberchuk

(57) ABSTRACT

A method of determining segments in a series of images based on previous segmentation results and on motion estimation. A second segment (108) of a second image (106) is determined based on a first segment (102) of a first image (100), with the first segment (102) and the second segment (108) corresponding to one object (104). The method comprises a calculation step to compare values of pixels of the first image (100) and the second image (106) in order to calculate a motion model which defines the transformation of the first segment (102) into the second segment (108). An example of such a motion model allows only translation. Translation can be described with one motion vector (110).

11 Claims, 3 Drawing Sheets

Figure 1:
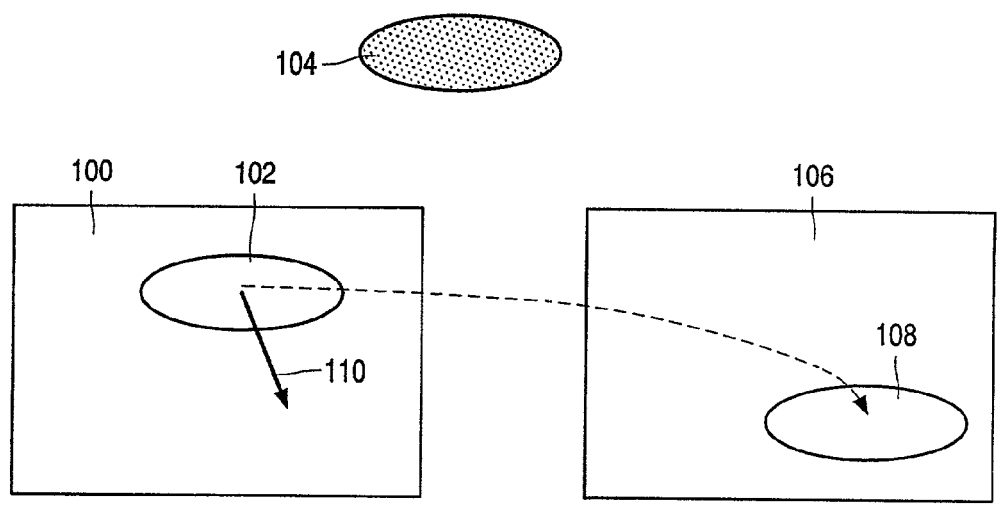

SEGMENTATION UNIT FOR AND METHOD OF DETERMINING A SECOND SEGMENT AND IMAGE PROCESSING APPARATUS

The invention relates to a method of determining a second segment of a second image, with the determining based on a first segment of a first image, with the first segment and the second segment corresponding to an object.

The invention further relates to a segmentation unit for determining a second segment of a second image, with the determining based on a first segment of a first image, with the first segment and the second segment corresponding to an object.

The invention further relates to an image processing apparatus comprising:

a segmentation unit for determining a second segment of a second image, with the determining based on a first segment of a first image, with the first segment and the second segment corresponding to an object; and an analyzer designed to analyze the first segment and the second segment.

A segmentation unit of the kind described in the opening paragraph is known from the Philips medical workstation which is called EasyVision. This workstation comprises various applications which enable a user to perform a plurality of image processing tasks. Image segmentation is an essential step in numerous image processing tasks. In some of these applications use is made of such a type of segmentation unit. Below this usage will be explained by means of an example. A particular type of EasyVision application enables analysis of MR (magnetic resonance) cardiology images. A purpose of this analysis is to determine the volume of the heart of a patient during the phases of the heart cycle. With an MR system a series of images is acquired of the human thorax and sent to the workstation for further processing. These images all represent a slice of the thorax including the ventricle, i.e. each image shows besides the ventricle various other parts of the patients anatomy. Because of the contraction of the heart muscle the shape of the ventricle is different for the various images. In order to perform the analysis, the ventricle must be segmented in all the images. In other words the pixels that correspond to the ventricle must be masked. The procedure to perform the segmentation is as follows. The user draws a contour on the first image of the series which corresponds to the ventricle as shown in the first image. This contour is then propagated, i.e. copied to the second image. The user can manually adjust the shape of this copied contour in the second image in order to create a contour that matches the shape of the ventricle as shown in the second image. The latter contour can then be propagated to a subsequent image. A more sophisticated technique to adjust the contours is also available. In that case a contour is also copied to a subsequent image but the modification of the contour is controlled by an automatic contour detection unit. This automatic contour detection unit searches for edges in the second image in the neighborhood of the copied contour. The new contour is overlaid on the detected edges. Although this procedure can result in satisfying results, it tends to fail in the case that the edges are difficult to detect.

It is a first object of the invention to provide a method of the kind described in the opening paragraph that enables a relatively robust segmentation of segments in a series of images.

It is a second object of the invention to provide a segmentation unit of the kind described in the opening paragraph that is designed to perform a relatively robust segmentation of segments in a series of images.

It is a third object of the invention to provide an image processing apparatus comprising a segmentation unit of the kind described in the opening paragraph that is designed to perform a relatively robust segmentation of segments in a series of images.

The first object of the invention is achieved in that the method comprises a calculation step to calculate a segment motion model which defines a transformation of the first segment into the second segment, by comparing values of pixels of the first image and the second image. A segment motion model defines how a segment changes its shape and or position. A segment motion model can be e.g. a linear affine model with 6 parameters describing translation, resizing, shear, rotation and any combination of those. A simple segment motion model allows e.g. only translation. A translation can be described with just one vector: a motion vector.

The main difference between the method according to the invention and the method according to the prior art, is that additional information is taken into account to achieve the segmentation of the second segment:

In the method according to the prior art only the values of the pixels of the second image are used to find the contour of the second segment in the second image. Besides the location of the first contour, i.e. the border of the first segment, no other information of the first image is taken into account to detect the second contour in the second image. In the method according to the invention the pixel values of both images are used to calculate the segment motion vector.

In the method according to the prior art only pixels of the second image which are located in the environment of the copy of the first contour, i.e. after propagation of the first contour to the second image, are taken into account. In the method according to the invention also the pixels inside the contour, i.e. other pixels of the segment, are used to calculate the segment motion vector.

This additional information results in a relatively robust segmentation. In the application of the prior art described above the shape of the object changes in time. However it is also possible that the shape of the object doesn't change but its position in relation to the imaging equipment alters. The method according to the invention can also be applied in applications that require segmentation of objects that don't change their shape but only their position.

An embodiment of the method according to the invention comprises:

a first step to calculate a motion vector field based on the first image and the second image, comprising a plurality of motion vectors, with each motion vector describing a translation from a first block of pixels of the first image to a second block of pixels of the second image; and a second step to calculate a segment motion vector, based on the motion vectors of the motion vector field.

For the first step a standard motion estimator can be applied to calculate a motion vector field quite fast and accurate. E.g. a motion estimator as described by G. de Haan, et al in "True motion estimation with 3-D recursive search block-matching," in Proceedings IEEE International Conference on Circuits and Systems for Video Technology, 1994, vol. 3, pp. 249–256. A motion estimator might also be based on matching with irregular shaped templates. In the second step the motion vectors which are inside the first segment, e.g. enclosed by the border of the segment, are then analyzed to find a motion vector that describes the translation of the first segment. The transformation of the first segment to the position of the second segment corresponds to a change of the position of the object: translation. The segment motion vector that describes the transformation can be determined by taking a modal value or an average value of the motion vectors which are located in a portion of the motion vector field that substantially corresponds with the first segment. To calculate a modal value use can be made of a two dimensional histogram with motion vectors.

An embodiment of the method according to the invention comprises a filter step to discriminate between the motion vectors of the motion vector field. Confidence levels of the motion vectors can be used as weight factors in order to filter the motion vectors. Optionally outliers are neglected. Outliers are motion vectors for which their values differ more than a predetermined threshold from a pre-selected or pre-calculated value. Especially in occlusion areas, there might be some erroneous motion vectors. However, it is reasonable to assume that in the motion vector field generated by a good quality motion estimator, most of the values of the motion vectors assigned to a segment are correct.

In an embodiment of the method according to the invention at least two segment motion vectors are calculated in the second step. With multiple segment motion vectors having their origin at different locations it is possible to describe e.g. a rotation of the segment. The advantage of this embodiment is that besides a translation also a rotation of the object can be tracked.

An embodiment of the method according to the invention comprises a third step to adjust a shape of the second segment based on the motion vectors of the motion vector field. Besides rotation or translation of the object in a plane parallel to the imaging plane other movements are possible. The result is a change of the projection of the object, for which it might not be possible to describe it with an affine transformation. In the description of the prior art another type of reason is outlined why the shape of an object might change resulting in a modification of the shape of the segment: the object changes its shape. A third reason can be that in a scene several objects move. The effect of that might be that segments occlude each other. It is an advantage of this embodiment that it combines determining of the transformation of the first segment into the second and an adaptation of the shape of the second segment.

The second object of the invention is achieved in that the segmentation unit comprises an estimator designed to calculate a segment motion model which defines the transformation of the first segment into the second segment, by comparing values of pixels of the first image and the second image.

The third object of the invention is achieved in that the image processing apparatus comprises a segmentation unit comprising an estimator designed to calculate a segment motion model which defines the transformation of the first segment into the second segment, by comparing values of pixels of the first image and the second image.

Figure 2:
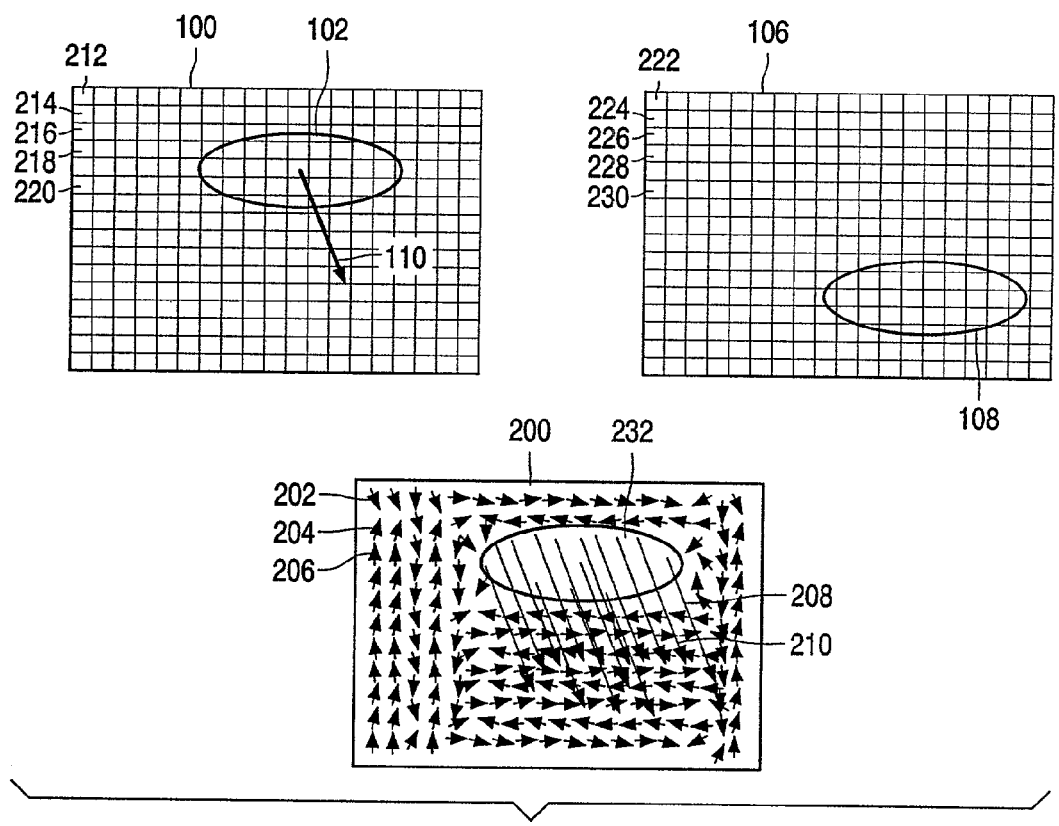
Figure 3:
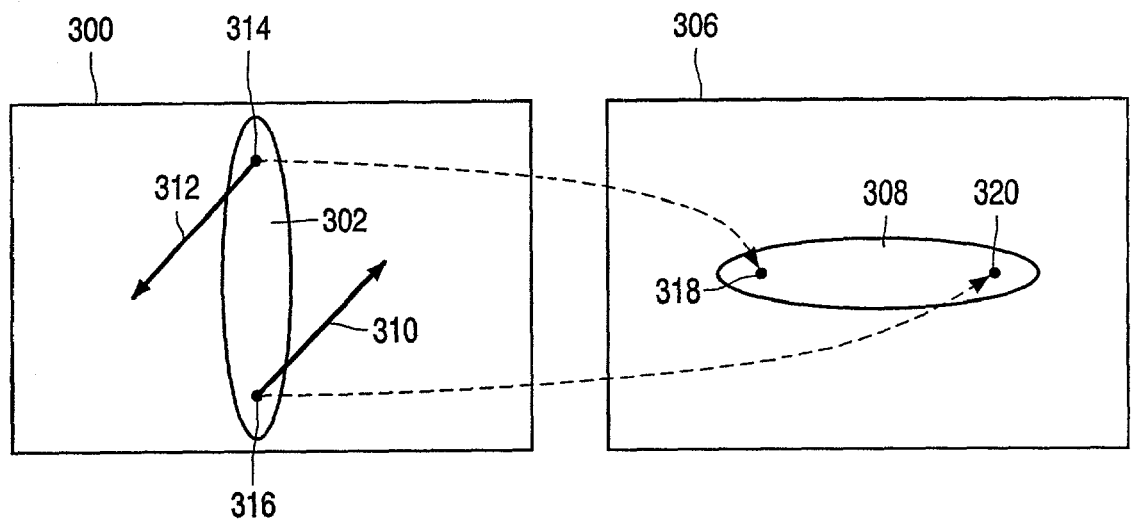
Figure 4A:
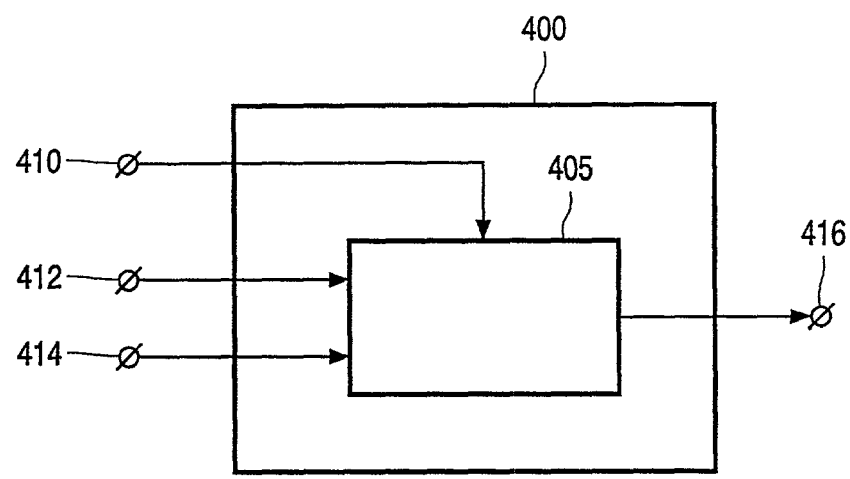
Figure 4B:
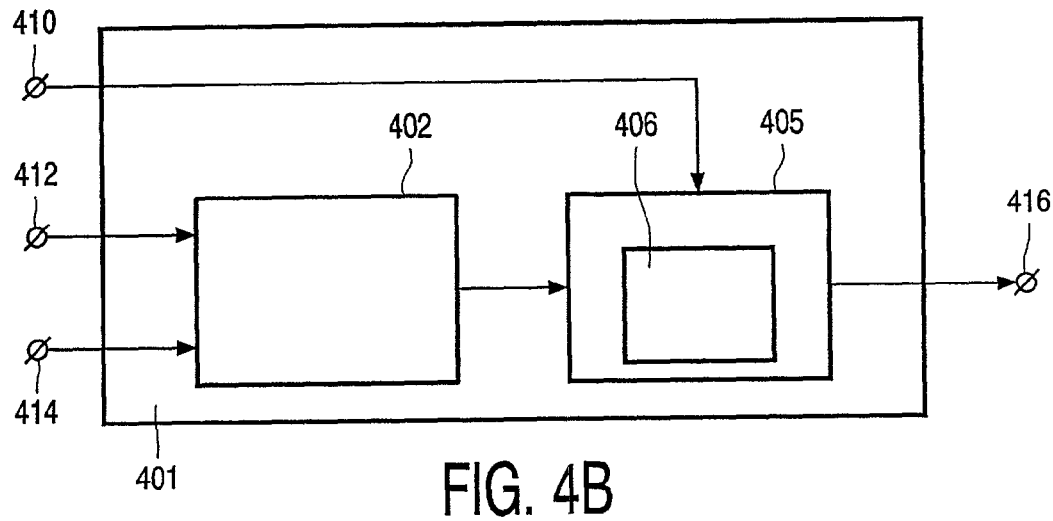
Figure 4C:
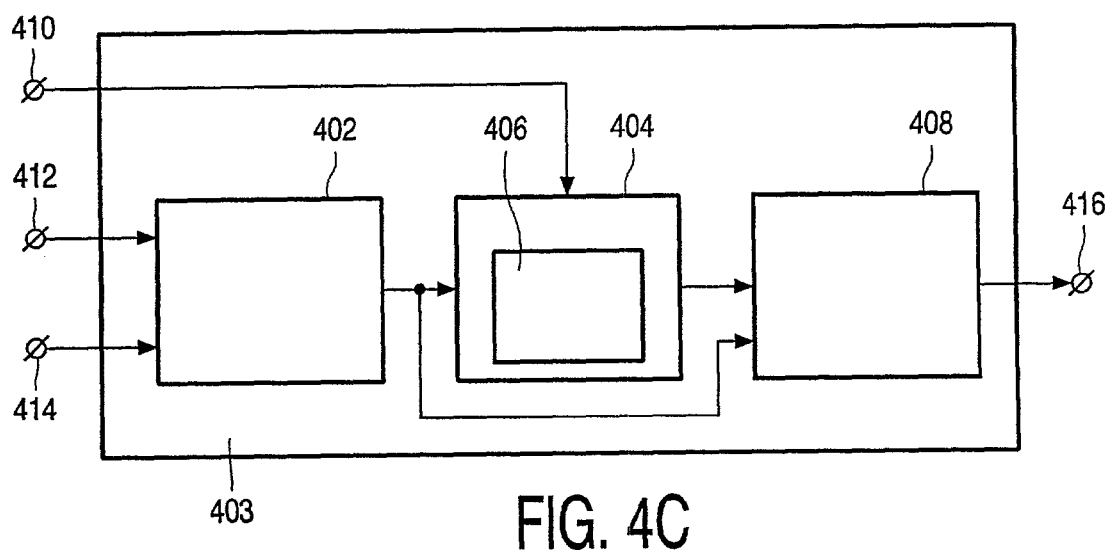
Figure 5:
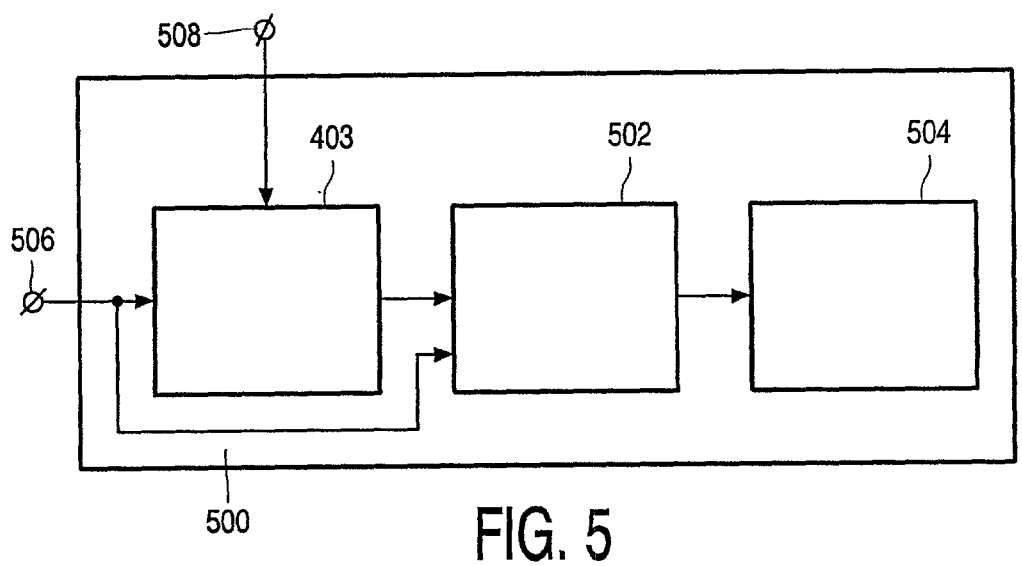

These and other aspects of the method, the segmentation unit and of the image processing apparatus according to the invention will become apparent from and will be elucidated with reference with respect to the implementations and embodiments described hereinafter and with reference to the accompanying drawings, wherein:

FIG. 1 schematically shows the relation between two segments and a segment motion vector;

FIG. 2 schematically shows the relation between a motion vector field and a segment motion vector;

FIG. 3 schematically shows that the transformation from a first segment to a second segment can be described by two segment motion vectors;

FIG. 4A schematically shows an embodiment of a segmentation unit;

FIG. 4B schematically shows an embodiment of a segmentation unit in which the segment motion vector is determined by making use of a plurality of motion vectors of a motion vector field;

FIG. 4C schematically shows an embodiment of a segmentation unit that includes a shape adapter; and FIG. 5 schematically shows an embodiment of an image processing apparatus comprising a segmentation unit.

FIG. 1 schematically shows the relation between two segments 102, 108 and a segment motion vector 110. An object 104 is imaged twice, resulting in a first image 100 and a second image 106. Both images comprise the projection of the object 104, but the object 104 has moved between the timeslots of acquisition of the first image 100 and the second image 106. In the first image 100 the portion of the first image 100 that corresponds with the object 104 is masked by the first segment 102. In the second image 106 the portion of the second image 106 that corresponds with the object 104 is masked by the second segment 108. The first segment 102 can be the result of a segmentation performed by a user or it can be the result of an automatic segmentation performed by a segmentation unit, e.g. 400. The location of the second segment 108 in the second image 106 is defined by the location of the first segment 102 in the first image 100 and the segment motion vector 110: the second segment 108 can be found by copying the mask of the first segment 102 into the second image 106 and translate this mask in the direction and with a distance of the segment motion vector 110. The segment motion vector 110 can be calculated by comparing pixel values of the first image 100 and the second image 106. With comparing is meant a strategy of minimization of an appropriate error function, or maximization of an appropriate match function, e.g. the cross correlation of pixel values of both images. For example a portion of the first image 100 substantially comprising the pixels of the first segment 102 can be convoluted with the pixels of the second image 106. The pixel values can represent e.g. luminance or color. The first image 100 and the second image 106 can be two successive images of a series of images. It is also possible that the first image 100 and the second image 106 belong to the same series but that they are not successive, i.e. there might be e.g. a third image which succeeds the first image 100 and precedes the second image.

FIG. 2 schematically shows the relation between a motion vector field 200 and a segment motion vector 110. FIG. 2 shows that the first image 100 is divided in a plurality of blocks of pixels 212–220 and the second image 106 is divided in a plurality of blocks of pixels 222–230. Such a block of pixels may comprise a number of pixels ranging from one pixel to e.g. 64*64 pixels. The number of pixels of such a block in horizontal and vertical direction can be unequal. For each block of pixels 212–220 a motion vector 202–210 is calculated. Such a motion vector 202–210 defines the direction and distance to which the corresponding block of pixels 212–220 should be moved such that in the second image 106 corresponding information can be found. A standard motion estimator can be applied to calculate the motion vector field 200. E.g. a motion estimator as described by G. de Haan, et al in "True motion estimation with 3-D recursive search block-matching," in Proceedings IEEE International Conference on Circuits and Systems for Video Technology, 1994, vol. 3, pp. 249–256. Most of the motion vectors of the motion vector field in FIG. 2 are rather small and have a random direction, e.g. 202–206. However those motion vectors 208, 210 which are located in a portion 232 of the motion vector field 200 that substantially corresponds with the first segment 102 are quite consistent. By taking the average or modal value of these latter motion vectors 208, 210 the segment motion vector 110 can be determined.

FIG. 3 schematically shows that the transformation from a first segment 302 of a first image 300 into a second segment 308 of a second image 306, can be described by two segment motion vectors 310,312. In FIG. 3 the imaged object is modeled as an object which is not de-formable and which has three degrees of freedom: rotation in a plane parallel of the image 300, translation in horizontal direction and translation in vertical direction. The origin of each of the two segment motion vectors 310, 312 correspond with points 316, 314, respectively, of the first segment 302. These points 316, 314 are translated to the points 320, 318, respectively, of the second segment 308. All other points of the first segment 302 can be uniquely mapped to points of the second segment 308, because the segments correspond to an object which is not de-formable. More complicated transformations than which is depicted in FIG. 3, are possible. The concept is based on a motion model: all motion vectors (310, 312) corresponding to one object describe the movement of the object.

FIG. 4A schematically shows an embodiment of a segmentation unit 400 comprising an estimator 405 designed to calculate a segment motion vector 110 which defines the transformation of the first segment 102 into the second segment 108, by comparing values of pixels of the first image 100 and the second image 106. The input of the segmentation unit 400 is provided at the input connectors 410–414:

The first segment 102 as a binary mask, e.g. a two dimensional array of binary values at input connector 410;

The second image 106 as a two dimensional array of pixel values at input connector 412; and The first image 100 as a two dimensional array of pixel values at input connector 414.

The segmentation unit 400 provides its output, i.e. the second segment 108 as a binary mask at the output connector 416. The second segment 108 is determined by means of a strategy of maximization of an appropriate match function, i.e. the cross correlation of pixel values of both images. For example a portion of the first image 100 substantially comprising the pixels of the first segment 102 is convoluted with the pixels of the second image 106.

FIG. 4B schematically shows an embodiment of a segmentation unit 401 in which the segment motion vector 110 is determined by making use of a plurality of motion vectors 202–210 of a motion vector field 200. The input and output of the segmentation unit 401 are comparable with the input and output of the segmentation unit 400 as described in FIG. 4A. The segmentation unit comprises:

A motion estimator 402 that is designed to calculate a motion vector field 200 based on the first image 100 and the second image 106. The motion vector field 200 comprises a plurality of motion vectors 202–210, with each motion vector 202–210 describing a translation from a first block of pixels 212–220 of the first image 100 to a second block of pixels 222–230 of the second image 106. The motion estimator 402 is able to calculate a motion vector field 200 based on more than two images.

An estimator 404 being designed to calculate a segment motion vector 110 which corresponds to a transformation of the first segment 102, based on the motion vectors 202–210 of the motion vector field 200. The motion vector 110 that describes the transformation can be determined by taking a modal value or an average value of the motion vectors 208, 210 which are located in a portion of the motion vector field 232 that substantially corresponds with the first segment 102. By this determination use can be made of weight factors assigned to the motion vectors 202–210 of the motion vector field 200. The weight factors can be based on the confidence levels of the motion vectors 202–210 as provided by the motion estimator 402 and/or they can be based on the distance of a corresponding block of pixels 212–220 to the border of the first segment. E.g., if the block of pixels of a particular motion vector is located close to or at the border of a segment, then the probability that the particular motion vector is erroneous is large. The weight factor should be low in that case; and Optionally a filter 406, being part of the estimator 404, which is designed to remove outliers. Outliers are motion vectors for which their values differ more than a predetermined threshold from a pre-selected or pre-calculated value.

FIG. 4C schematically shows an embodiment of a segmentation unit 403 that includes a shape adapter 408. This embodiment is almost equal with the segmentation unit 401 as described in FIG. 4B. The main difference is that this segmentation unit 403 is capable of adapting the shape of the second segment 108. The segmentation unit 401 as described in FIG. 4B provides as output a second segment 108 having a shape which is equal with the shape of the first segment 102. In the following cases the shape of the second segment 108 might be adapted:

If the motion vectors from the motion vector field 200 which are located in a portion of the motion vector field that substantially corresponds with the border of the first segment 102, differ from the motion vectors 208, 210 that are located in the portion 232 of the motion vector field that substantially corresponds with the first segment 102 then it might be assumed that these "border motion vectors" are not related to the object.

If the motion vectors from the motion vector field 200 which are located in a portion of the motion vector field that substantially corresponds with the direct environment of the first segment 102, are rather similar to the motion vectors 208, 210 that are located in the portion 232 of the motion vector field that substantially corresponds with the first segment 102 then it might be assumed that these "environment motion vectors" are also related to the object.

The adaptation of the shape is based on the blocks of pixels that correspond to the above mentioned motion vectors: "border motion vectors" and "environment motion vectors."

FIG. 5 schematically shows an embodiment of an image processing apparatus 500 comprising:

a segmentation unit 403 as described in FIG. 4C;

an analyzer 502 designed to analyze the portions of the image that are segmented by the segmentation unit 403; and a display device 504 to visualize the analysis results.

A series of images is provided at the input connector 506 of the image processing apparatus 500. A user can interact with the image processing apparatus 500 via the user interface 508 in order to manually segment a region of interest, i.e. the first segment in the first image of the series. The segmentation unit 403 is able to calculate a second segment based on this first segment and on the first two images of the series of images. After that the segmentation unit 403 is able to calculate a third segment based on either:

the first segment and on the first and third image of the series; or the second segment and on the second and third image of the series.

Subsequent segments of other images of the series can be calculated accordingly. The output of the segmentation unit 403 together with the images are exchanged to the analyzer 502. The analyzer is designed to estimate the 3-Dimensional properties of the object which correspond to the segments as segmented by the segmentation unit 403. The output of the analyzer is displayed on the display device 504.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware.

The invention claimed is:

1. A method of determining a second segment of a second image, with the determining based on a first segment of a first image, with the first segment and the second segment corresponding to an object, wherein the method comprises a calculation step to calculate a segment motion model which defines a transformation of the first segment into the second segment, by comparing values of pixels of the first image and the second image, wherein the calculation step comprises:
   a first sub step to calculate a motion vector field based on the first image and the second image, the motion vector field comprising a plurality of motion vectors, with each motion vector describing a translation from a first block of pixels of the first image to a second block of pixels of the second image;
   a second sub step to calculate a segment motion vector, based on the motion vectors of the motion vector field; and
   a third sub step to adjust a shape of the second segment based on a comparison of a plurality of the motion vectors of the motion vector field.

2. A method as claimed in claim 1, wherein the method comprises a filter step to discriminate between the motion vectors of the motion vector field.

3. A method as claimed in claim 1, wherein the segment motion vector corresponds to a modal value of motion vectors which are located in a portion of the motion vector field that substantially corresponds with the first segment.

4. A method as claimed in claim 1, wherein the segment motion vector corresponds to an average value of the motion vectors which are located in the portion of the motion vector field that substantially corresponds with the first segment.

5. A method as claimed in claim 1, wherein in the second sub step at least two segment motion vectors are calculated.

6. A segmentation unit for determining a second segment of a second image, with the determining based on a first segment of a first image, with the first segment and the second segment corresponding to an object, wherein the segmentation unit comprises:
   an estimator designed to calculate a segment motion model which defines a transformation of the first segment into the second segment, by comparing values of pixels of the first image and the second image;
   a motion estimator that is designed to calculate a motion vector field based on the first image and the second image, the motion vector field comprising a plurality of motion vectors, with each motion vector describing a translation from a first block of pixels of the first image to a second block of pixels of the second image, the estimator being designed to calculate a segment motion vector, based on the motion vectors of the motion vector field; and
   a shape adapter that is arranged to adjust a shape of the second segment, based on a comparison of a plurality of the motion vectors of the motion vector field.

7. A segmentation unit as claimed in claim 6, comprising a filter for discriminating between the motion vectors of the motion vector field.

8. A segmentation unit as claimed in claim 6, wherein the estimator is designed to calculate the segment motion vector that corresponds to a modal value of motion vectors which are located in a portion of the motion vector field tat substantially corresponds with the first segment.

9. A segmentation unit as claimed in claim 6, wherein the estimator is designed to calculate the segment motion vector that corresponds to an average value of the motion vectors which are located in the portion of the motion vector field that substantially corresponds with the first segment.

10. A segmentation unit as claimed in claim 6, wherein the estimator is designed to calculate at least two segment motion vectors.

11. An image processing apparatus comprising:
   a segmentation unit for determining a second segment of a second image, with the determining based on a first segment of a first image, with the first segment and the second segment corresponding to an object; and
   an analyzer designed to analyze the first segment and the second segment, wherein the segmentation unit comprises:
     an estimator designed to calculate a segment motion vector which defines a transformation of the first segment into the second segment, by comparing values of pixels of the first image and the second image;
     a motion estimator that is designed to calculate a motion vector field based on the first image and the second image, the motion vector field comprising a plurality of motion vectors, with each motion vector describing a translation from a first block of pixels of the first image to a second block of pixels of the second image, the estimator being designed to calculate the segment motion vector based on motion vectors of the motion vector field which are located in a portion of the motion vector field that substantially corresponds with the fist segment; and
     a shape adapter that is arranged to adjust a shape of the second segment, based on a comparison of a plurality of the motion vectors of the motion vector field.

* * * * *